United States Patent
Poertzgen et al.

(10) Patent No.: US 8,452,507 B2
(45) Date of Patent: May 28, 2013

(54) ACTUATOR DEVICE AND METHOD FOR CONTROLLING THE ACTUATOR DEVICE

(75) Inventors: Gregor Poertzgen, Koblenz (DE); Christian Dilla, Bendorf (DE)

(73) Assignee: Lucas Automotive GmbH, Koblenz (DE)

( * ) Notice: Subject to any disclaimer, the term of this patent is extended or adjusted under 35 U.S.C. 154(b) by 297 days.

(21) Appl. No.: 12/747,255

(22) PCT Filed: Dec. 10, 2008

(86) PCT No.: PCT/EP2008/010484
§ 371 (c)(1),
(2), (4) Date: Jul. 29, 2010

(87) PCT Pub. No.: WO2009/074309
PCT Pub. Date: Jun. 18, 2009

(65) Prior Publication Data
US 2010/0314207 A1    Dec. 16, 2010

(30) Foreign Application Priority Data
Dec. 12, 2007   (DE) .......................... 10 2007 059 688

(51) Int. Cl.
G06F 7/70     (2006.01)
G06F 19/00    (2011.01)
G06G 7/00     (2006.01)
G06G 7/76     (2006.01)

(52) U.S. Cl.
USPC ................................. 701/70; 701/1; 188/158

(58) Field of Classification Search
USPC .. 701/1–80; 303/146–148, 166, 167; 188/162
See application file for complete search history.

(56) References Cited

U.S. PATENT DOCUMENTS

| | | | |
|---|---|---|---|
| 5,202,019 A * | 4/1993 | Skogland | 210/159 |
| 5,255,962 A | 10/1993 | Neuhaus et al. | |
| 5,752,748 A | 5/1998 | Schramm et al. | |
| 6,203,115 B1 * | 3/2001 | Rosendahl et al. | 303/3 |
| 6,216,080 B1 * | 4/2001 | Riedemann et al. | 701/71 |
| 6,264,289 B1 * | 7/2001 | Franke et al. | 303/20 |
| 6,299,261 B1 * | 10/2001 | Weiberle et al. | 303/20 |
| 6,378,960 B1 * | 4/2002 | Demmeler | 303/155 |
| 6,445,993 B1 * | 9/2002 | Eccleston et al. | 701/70 |
| 6,449,551 B1 | 9/2002 | Wrede | |
| 6,595,599 B2 * | 7/2003 | Soga | 303/113.1 |
| 6,615,125 B2 * | 9/2003 | Eccleston et al. | 701/70 |

(Continued)

FOREIGN PATENT DOCUMENTS

| | | |
|---|---|---|
| DE | 4022671 A1 | 1/1992 |
| DE | 4339570 A1 | 5/1995 |

(Continued)

Primary Examiner — Khoi Tran
Assistant Examiner — Rachid Bendidi
(74) Attorney, Agent, or Firm — MacMillan, Sobanski & Todd, LLC

(57) ABSTRACT

An actuator device for use in a land vehicle, comprising an actuator for actuating a wheel brake of the land vehicle, a control unit for controlling the actuator and a processing unit. The processing unit is connected to the control unit and an external main control unit in order to route signals of the main control unit to the control unit. The actuator device further comprises a memory for storing actuator-specific information. This memory is connected to a monitoring unit. The monitoring unit is connected in turn to the control unit and the processing unit.

13 Claims, 2 Drawing Sheets

U.S. PATENT DOCUMENTS

| | | | |
|---|---|---|---|
| 6,701,242 B1 * | 3/2004 | Diebold | 701/70 |
| 7,096,108 B2 * | 8/2006 | Nilsson et al. | 701/70 |
| 7,325,887 B2 * | 2/2008 | McCann et al. | 303/155 |
| 7,338,136 B2 * | 3/2008 | Nakayama et al. | 303/3 |
| 7,497,526 B2 * | 3/2009 | Nilsson et al. | 303/20 |
| 7,996,136 B2 * | 8/2011 | Ruhnau | 701/70 |
| 8,007,055 B2 * | 8/2011 | Leiter | 303/122.03 |
| 8,167,383 B2 * | 5/2012 | Nishino et al. | 303/122.05 |
| 8,185,288 B2 * | 5/2012 | Strengert et al. | 701/70 |
| 2002/0050739 A1 * | 5/2002 | Koepff et al. | 303/122.09 |
| 2004/0015281 A1 | 1/2004 | Weiberle | |
| 2004/0162650 A1 | 8/2004 | Kueperkoch et al. | |
| 2008/0059018 A1 * | 3/2008 | Kueperkoch et al. | 701/34 |
| 2008/0059038 A1 * | 3/2008 | Yoshida et al. | 701/99 |
| 2009/0143947 A1 * | 6/2009 | Bezdek | 701/51 |
| 2010/0299024 A1 * | 11/2010 | Muders et al. | 701/36 |

FOREIGN PATENT DOCUMENTS

| | | |
|---|---|---|
| DE | 19832167 A1 | 5/1999 |
| DE | 19854788 A1 | 5/2000 |
| DE | 19954284 A1 | 5/2001 |
| DE | 10118263 A1 | 10/2002 |

* cited by examiner

ACTUATOR DEVICE AND METHOD FOR CONTROLLING THE ACTUATOR DEVICE

CROSS-REFERENCE TO RELATED APPLICATIONS

This application is a national stage of International Application No. PCT/EP2008/010484 filed Dec. 10, 2008, the disclosures of which are incorporated herein by reference, and which claimed priority to German Patent Application No. 10 2007 059 688.1 filed Dec. 12, 2007, the disclosures of which are incorporated herein by reference.

BACKGROUND OF THE INVENTION

In the following, an actuator device with a processing unit for use in a land vehicle is described, wherein the actuator device is connected to a main control unit contained in the land vehicle.

Actuator devices are frequently used in modern land vehicles. In this case a processing unit is normally provided, which is subordinate to a main control unit. The main control unit is designed to transmit control commands, for example actuator setting commands, to the processing unit. The processing unit receives the control commands from the main control unit and is provided to control the actuator according to the commands transmitted by the main control unit. In this case the main control unit acts as a master unit and the processing unit serves as a slave unit. Such a concept makes it possible for example to arrange power electronics for operating the actuator spatially separated from the main control unit. The communication between the main control unit and the processing unit normally takes place via a data bus. In the case of land vehicles, such a bus is often a LIN bus, a CAN bus or a FlexRay bus.

An electronic control system for a vehicle braking system is known from DE 101 18 263 A1, and corresponding US patent publication No. 2004/015281, the US document being incorporated by reference herein. The control system has a fault-tolerant driver input module for recording driver braking input and two brake circuit modules for controlling the wheel brakes. Assigned to each brake circuit module is an electrically controllable brake actuator, assigned to which structurally and logically is a local electronic unit for executing actuator-specific control functions and/or sensor-specific evaluation functions, which unit is connected via a local brake circuit data bus to the brake circuit module of the respective brake circuit. The sensor signals of each respective actuator and the at least one wheel, to which the actuator applies a braking force, are recorded by the local electronic unit and made available as digital signals to the brake module via the brake circuit data bus. The brake actuators of one brake circuit are electromechanical actuators with an electronically commutated motor, the commutation of the motor being carried out in the local electronic unit. The local electronic units and the assigned sensors are supplied with electrical energy via the brake circuit data bus or its physical medium. The brake circuit modules are connected via a fault-tolerant communications system to one another, to the driver input module and to an optionally present control module for calculating primary brake regulating functions. The control modules of the vehicle braking system are connected to control modules of additional electronic control systems via a fault-tolerant communications system, which is designed as a vehicle data bus. In the driver input module, in addition to the service brake input or parking brake input, the steering input, driving position selection or the propulsive power input is recorded and transmitted via the communications system to the corresponding control module for making a setting. In the driving dynamics module, in the event of situations that are critical from a driving dynamics point of view, a modification of the driver steering input is undertaken while convenience functions such as a variable steering ratio are displayed.

From DE 198 54 788 A1, and corresponding U.S. Pat. No. 6,216,080 B1, the US document being incorporated by reference herein, a wheel module for a vehicle with an electrically controllable braking system for the control of the braking force on at least one wheel of the vehicle is known. A brake value indicating the desired target braking force for the wheel, a wheel-specific signal of the wheel and an additional wheel-specific signal of an additional wheel are supplied to the wheel module. The wheel module emits an adjusting signal calculated using the brake value and the wheel-specific signals to an actuator. The actuator serves to adjust the braking force on the wheel. Assigned to the wheel are a main regulating channel and an additional regulating channel. Wheel-specific computing steps are executed in each case in both regulating channels. The adjusting signal is computed in the main regulating channel using computing results of the additional regulating channel. The wheel-specific signal of the wheel is supplied to the wheel module at a higher repetition frequency than the additional wheel-specific signal of the additional wheel. A signal indicating the rotational speed of the wheel is used as a wheel-specific signal. The wheel-specific computing steps contain computing steps for an antilock regulation of a wheel, in which intermediate results are formed, and the adjusting signal is calculated by using the intermediate results. A central module is used for central execution of vehicle-wide brake control functions, the central module being connected to the wheel modules via one or more data bus systems for the exchange of information.

An electronic brake system for road vehicles with an electronic device that serves to control brake-pressure modulators is known from DE 40 22 671 A1, and corresponding U.S. Pat. No. 5,255,962 A, the US document being incorporated by reference herein. The electronic device is divided up into several wheel modules with their own intelligence that are assigned to the wheels and provided with at least one microcomputer, the wheel modules being arranged spatially in the vicinity of the wheels. A superior central module provided with a microcomputer has its own intelligence and is arranged in a central location of the vehicle. The central module receives the values of an operating brake-value transmitter and a parking brake. The wheel modules receive a brake pressure reference value from the central module. The wheel modules receive measured values for the wheel speed and the brake pressure from sensors on the related wheel or brake cylinder or brake-pressure modulator. The wheel modules transmit at least one of the measured values they receive and information derived therefrom respectively to the central module. The wheel modules generate electric output signals to control a related brake-pressure modulator that is preferably structurally combined with the wheel modules. The information exchange between the central module and the wheel modules takes place via at least one data bus with fixed interfaces. A brake pressure modification and subdivision respectively are performed in the central modules according to load criteria and/or brake lining wear criteria. An antilock and/or antiskid function is contained in the wheel modules. A vehicle reference speed for the antilock function is formed in the central module. In the event of a disturbance, the power supply to the wheel modules can be switched off by the central module by means of electronic switches or relays. The data buses are formed as optical fibres. The wheel modules receive information about brake lining thicknesses and temperatures via additional input lines. Two wheel modules can be combined to form one axle module.

DE 43 39 570 A1, and corresponding U.S. Pat. No. 5,752, 748 A, the US document being incorporated by reference herein, show an electronic brake system in which an intelligent central module and intelligent brake modules assigned to the wheels or wheel groups are provided. The brake modules are connected to the central module via a communications system and send sensor signals to the central module and receive brake pressure nominal values from the central module. The brake modules control the nominal brake pressures by means of electrically operable actuators assigned to the wheels depending on the brake pedal input requirement at the wheels. The brake pedal is additionally formed as a pressure generator and is connectable to the brakes of a brake circuit via a switch unit. The brake pedal sensor is connected to a brake module to route the sensor value to the central module and to calculate the nominal brake pressures for all wheels if the central module fails and to route these to the corresponding brake modules via the communications system. If the brake module fails, this connection is made.

The brake module connected to the pedal sensor is assigned to the brake circuit, which is connectable to the pressure generator operated by the brake pedal. The brake circuit connectable to the pressure generator operable by the brake pedal is the front axle brake circuit. The brake circuit is connected to the pressure generator operable by the brake pedal if faulty pedal sensor signals occur.

A braking system for a motor vehicle is known from DE 196 15 186 C1, and corresponding U.S. Pat. No. 6,030,054 A, the US document being incorporated by reference herein, with an actuating device, which is formed as an electromechanical wheel brake actuator mounted on the brake calliper of a wheel, which actuator contains a spindle driven by an electric motor in an axial direction. The electric motor has a rotor, which is formed as a spindle nut of a spindle gear converting its rotary movement into a linear movement of the spindle. The axial force of the spindle is multiplied by a mechanical transmission and transmitted to a piston of a wheel brake cylinder to press brake linings onto a brake disc. Rotor magnets of the electric motor are fitted on the spindle nut. The wheel brake actuator with spindle gear is used as a parking brake. Control electronics are integrated into the housing of the wheel brake actuator.

Such actuators can be used in land vehicles in particular for safety-relevant systems, such as electronically controllable parking brake systems. Problems can occur, however, if incorrect signals are transmitted via the bus. If safety-relevant systems are affected by such a fault, significant consequences can result for vehicle safety. For example, in the case of a parking brake, the parking brake can be released in an uncontrolled manner on a slope due to an incorrect signal or can lead during travel to unexpected and undesired braking. Both can have a substantial adverse effect on the safety of the driver and the passengers in a vehicle as well as on other road users.

The object is to provide an actuator device for which system reliability is guaranteed even in the event of such a fault being present, so as not to jeopardize vehicle occupants as well as other road users unnecessarily.

BRIEF SUMMARY OF THE INVENTION

An actuator device for use in a land vehicle is proposed. This can comprise an actuator, which can operate a wheel brake of the land vehicle, a control unit, which can control the actuator, and a processing unit, which can be connected to the control unit and an external main control unit. The processing unit can be designed to route signals, such as actuator setting commands, from the main control unit to the control unit. In addition, the actuator device can comprise a memory for storing actuator-specific information. This can be connected to a monitoring unit, wherein the monitoring unit can be connected to the processing unit and the control unit.

With this proposed actuator device, actuator-specific information can now be drawn on to ensure system reliability. This was not previously possible, since actuator-specific information could not be stored in a form such that it could be assigned to a special actuator.

Due to the fact that the actuator-specific information can now be stored directly in the actuator device, it is possible to access this immediately if required. By keeping actuator-specific information ready directly in the actuator device, it is possible to improve the functionality of safety-relevant systems such as electronic parking brake systems, for example, and guarantee a high level of system reliability. The stored information can not only be used for "defect" recognition, e.g. no-load current with simultaneous temperature deviation in the actuator, but also for restricting the tolerance of the brake application force in each individual actuator.

The connections of the claimed actuator device can be designed for the transmission of signals and/or data and be realised as bus connections.

The monitoring unit contained can be designed to compare the actuator-specific information stored in the memory with signals which the processing unit can receive from the main control unit. The monitoring unit can ensure control of the actuator according to this comparison.

The monitoring unit can therefore be designed to prevent the processing unit from transmitting the signals from the main control unit to the control unit of the actuator if the comparison requires this.

If this is the case, the monitoring unit can be designed to transmit control signals it has generated to the control unit of the actuator.

Furthermore, the actuator device can comprise at least one sensor, which can be disposed at the actuator to carry out measurements, e.g. with reference to application force and actuator torque.

In addition, the actuator device can comprise at least one processor. This can make it possible to evaluate data, such as measured values of the least one sensor, directly in the actuator device without transmitting these via cable to external control apparatus. This can eliminate inaccuracies due to additional plug-in contacts and lines outside the actuator. A very accurate sensor value can be used to switch off power, therefore.

The at least one processor contained can be connected to the at least one sensor in order, as already indicated, to be able to evaluate measured values of the at least one sensor directly in the actuator device.

The at least one processor contained can also be connected to the memory, in order to transmit analyses to this. The analyses can be stored in the memory, as this can be calibrated specifically. If the actuator torque and/or the brake application force are measured for example by a sensor, the analyses of these measurements can be used to restrict the tolerance of the brake application force. To do this a correction factor for the brake application current, for example, can be stored. For each actuator, therefore, a known application force reduction due to efficiency loss, for example, can be compensated for and in the event of the actuator being replaced, the brake application current can be selected according to the new actuator.

In an advantageous development, external information can be supplied to the memory via at least one connection and stored therein. Via this connection, information stored in the memory, such as analyses of the at least one sensor contained, can also be interrogated from outside. Furthermore, information from an EOL check for quality and calibration purposes, for example, can be stored and interrogated if required.

The actuator device can be connected to an energy source for the supply of energy. The main control unit can be supplied with energy via another energy source.

To guarantee the supply of energy to all components of the actuator device, the connections of the actuator device can be designed to transmit energy as well as data and signals. A connection can comprise one or more electric lines, therefore, in addition to a data bus.

In a further advantageous development, the wheel brake activated by the actuator can be a parking brake.

Also claimed is an actuator system, which can comprise a main control unit and at least one claimed actuator device as well as an electronic parking brake, which can comprise one or more of the claimed actuator devices and a main control unit.

Furthermore, a method for controlling a claimed actuator device is claimed. This method comprises four steps. In the first step, the processing unit can receive signals, which can be transmitted by the main control unit. In the second step, the signals transmitted to the processing unit can be compared with actuator-specific information, wherein the actuator-specific information can be stored in the memory and the comparison can take place in the monitoring unit. Step three can comprise the transmission of control signals to the control unit. Depending on the result of the comparison, the control signals can be transmitted by the processing unit to the control unit and correspond to the signals of the main control unit, or the monitoring unit can transmit control signals to the control unit, wherein the control signals in this case can be signals generated by the monitoring unit itself. In the fourth step, control of the actuator by the control unit can take place on the basis of the control signals received by the control unit.

Other advantages of this invention will become apparent to those skilled in the art from the following detailed description of the preferred embodiments, when read in light of the accompanying drawings.

DETAILED DESCRIPTION OF THE INVENTION

Unless otherwise expressly mentioned, a connection in the scope of the following description is designed for signal transmission and for the transmission of electric voltage or electric current. In particular, a connection of this kind can comprise one or more electric lines in addition to e.g. a data bus.

Figure 1:
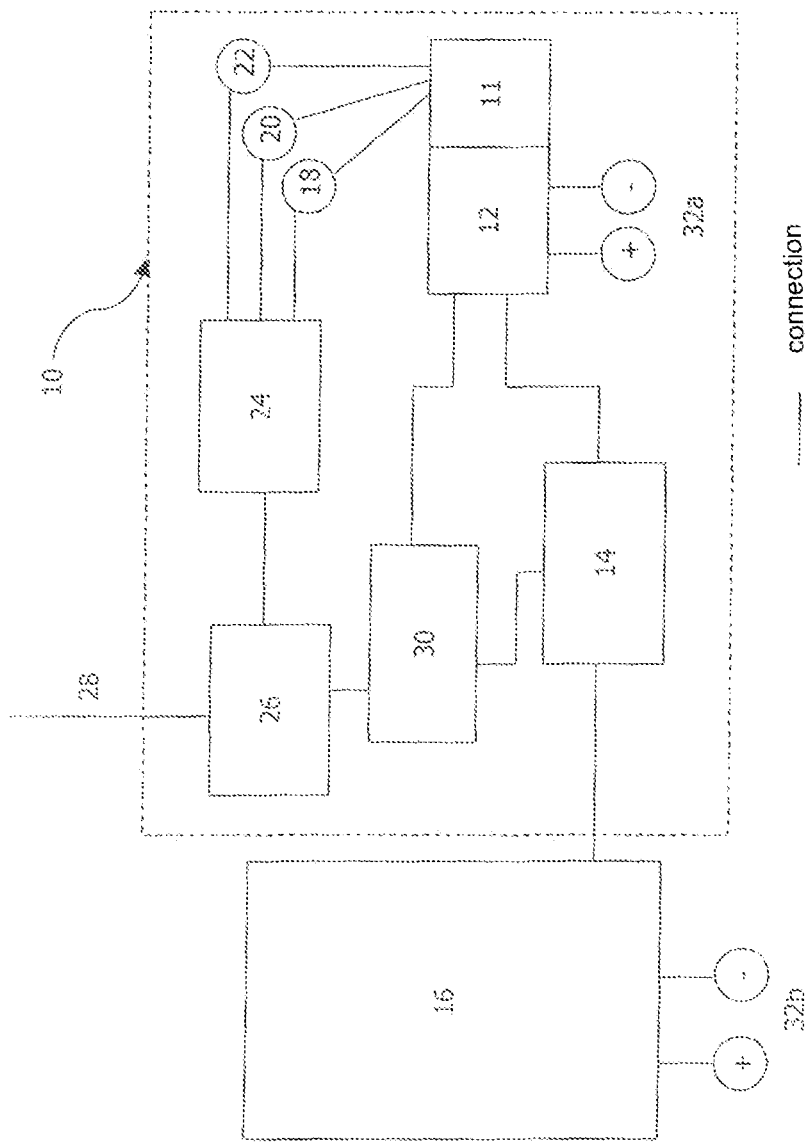
FIG. 1 shows a schematic view of a practical example of an actuator device.

FIG. 1 shows a schematic view of an actuator device 10. The actuator device 10 has a processing unit 14, a control unit 12 and an actuator 11. The control unit 12 is formed as a unit with the actuator 11, to control this. The actuator 11 can comprise a motor, for example, to release or operate a parking brake. The processing unit 14 is connected to the control unit 12.

In addition, the actuator device 10 comprises a monitoring unit 30, a memory 26, a processor 24 and sensors 18, 20, 22. A connection is provided between the monitoring unit 30 and the control unit 12. The processing unit 14 and the monitoring unit 30 are likewise connected to one another.

The sensors 18, 20, 22 in the actuator device 10 are used to record measured values, such as e.g. actuator torque and brake application force. They are connected directly to the actuator 11 and connections are also provided between the sensors 18, 20, 22 and the processor 24. Via this connection the measurements of the sensors 18, 20, 22 are transmitted to the processor 24 and evaluated directly in this. Via a further connection in the actuator device 10, which connection is formed between the processor 24 and the memory 26, the analyses of the processor 24 are transmitted to the memory 26 to be stored in this. The memory 26 is, in addition to the connection to the processor 24, also connected to the monitoring unit 30.

A voltage source 32a is provided for supplying the actuator device 10 with operating voltage. In this practical example, the voltage source 32a supplies the control unit 12 directly and the supply voltage applied passes via the electric lines to the connections of the actuator device 10 to the components contained, such as the actuator 11, the processing unit 14, the monitoring unit 30, the sensors 18, 20, 22, the processor 24 and the memory 26. A vehicle battery (not shown) can be used for example as the voltage source 32a.

Externally the actuator device 10 is connected to a main control unit 16. The main control unit 16 can comprise for example a microprocessor of an onboard computer of a land vehicle. It is connected directly to the processing unit 14. The main control unit 16 receives a driver (parking) brake input, for example, and in accordance with this transmits actuator setting commands to the processing unit 14.

Control of the actuator 11 by the control unit 12 according to the actuator setting commands of the main control unit 16 takes place only if a comparison of the actuator setting commands, which the processing unit 14 receives from the main control unit 16, with actuator-specific data stored in the memory 26 turns out "positively" in the monitoring unit 30. In this case, the comparison in the monitoring unit 30 turns out precisely "positively" if the monitoring unit 30 does not prevent the processing unit 14 from transmitting the actuator setting commands received from the main control unit 16.

If on the other hand the processing unit 14 is prevented from transmitting the actuator setting commands of the main control unit 16 on account of the comparison in the monitoring unit 30, the comparison is "negative". In this case the monitoring unit 30 transmits control signals it has generated directly to the control unit 12, in order to ensure actuator control according to the current situation. If for example the main control unit supplies an actuator setting command with a certain brake application force, it is compared in the monitoring unit 30 whether this brake application force is sufficient to achieve the desired braking effect. To do this, the analyses of the measurements of the sensors 18, 20, 22 are drawn on from the memory 26, for example. It is to be inferred from these analyses whether the certain application force of the actuator setting command is sufficient or must be adapted, e.g. on account of application force reduction due to efficiency loss over the lifetime of the actuator 11. A necessary adaptation, such as e.g. an increase in application force, is then realised by control of the actuator 11 according to the signals generated in the monitoring unit 30 itself.

In addition to the voltage source 32a, a second voltage source 32b is shown in FIG. 1. This second voltage source 32b supplies the main control unit 16 with supply voltage. The second voltage source 32b can, as in FIG. 1, be formed separately from the first voltage source 32a, or the two voltage sources 32a and 32b can be identical (not shown).

The actuator device 10 also comprises a connection 28 for information and data transmission between actuator device 10 and the environment, which connection is connected in the actuator device 10 to the memory 26. Via this connection 28, data can be interrogated from the memory 26 externally, for example by a service technician, or quality-relevant data, e.g. on the delivery status of the actuator device 10, can be input, in order then to be stored in the memory 26.

Figure 2:
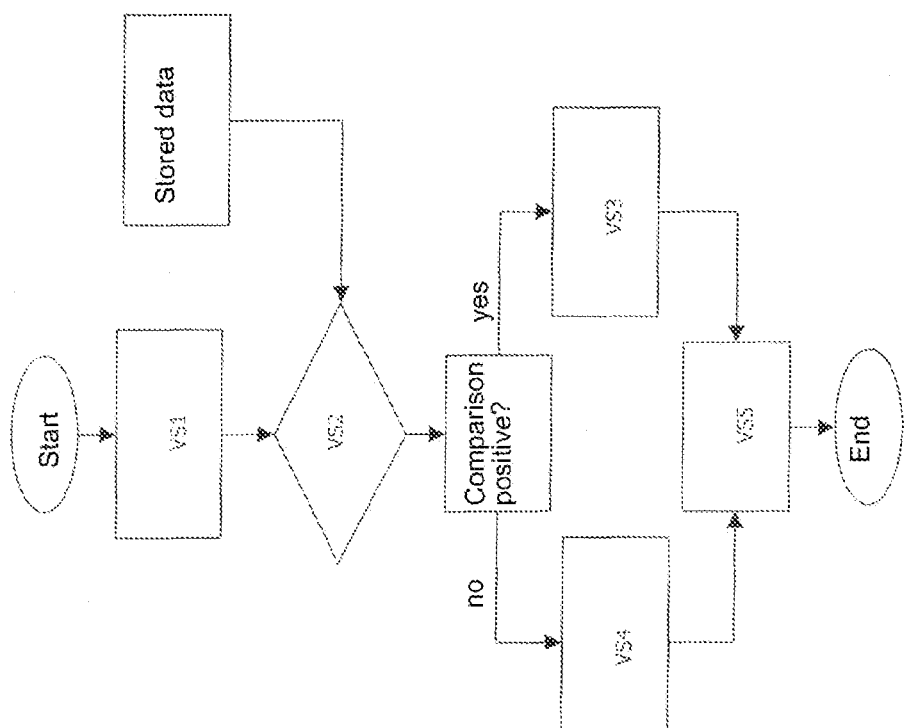
FIG. 2 shows a flow chart of a practical example of a method for controlling the actuator device from FIG. 1.

The method for controlling the actuator device from FIG. 1 will now be described with reference to FIG. 2.

In a first step VS1, the main control unit transmits actuator setting commands to the processing device in accordance with a driver (parking) brake input.

In step two VS2, these actuator setting commands are now compared with stored data from the memory. The question is asked whether this comparison has turned out "positive".

If the comparison has turned out "positive", VS3, the actuator setting commands of the main control unit received by the processing unit are routed to the control unit of the actuator, in order in the concluding step five VS5 to control the actuator according to the actuator setting commands of the main control unit.

If the comparison turns out "negative", step VS4 follows. In this step VS4 the monitoring unit itself generates signals, which are transmitted instead of the actuator setting commands of the main control unit to the control unit of the actuator and according to which the actuator is controlled in the concluding step VS5.

The method for controlling the actuator device from FIG. 1 ends with the control of the actuator.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Actuator device for use in a land vehicle, comprising:
   an actuator to activate a wheel brake of the land vehicle;
   an actuator control unit to control the actuator;
   a processing unit, which, for transmission of signals to the control unit, is connected to the actuator control unit, the processing unit being adapted to be connected to a main control unit that is external to the actuator device;
   a monitoring unit that is local to the actuator device and that is connected to the processing unit and the control unit; and
   a memory for storing actuator-specific information that also is local to the actuator device and that is connected to the monitoring unit, the monitoring unit configured to:
   compare the actuator-specific information stored in the memory with signals which the processing unit receives from the external main control unit in order to ensure control of the actuator according to this comparison,
   prevent the processing unit from transmitting the signals from the external main control unit to the actuator control unit, if the comparison in the monitoring unit so requires, and
   transmit control signals it has generated to the actuator control unit if the comparison in the monitoring unit leads to the processing unit being prevented from transmitting the signals from the external main control unit to the actuator control unit.

2. The actuator device according to claim 1, wherein the connections in the actuator device are designed to transmit at least one of signals and data.

3. The actuator device according to claim 1, wherein the actuator device also includes at least one sensor connected to the actuator for monitoring the operation of the actuator.

4. The actuator device according to claim 3, wherein the actuator device further includes at least one processor connected to at least one sensor, the processor being designed to process data from at least one sensor.

5. The actuator device according to claim 4, wherein the at least one processor is also connected to the memory.

6. The actuator device according to claim 5, wherein measurement values from the at least one sensor are analyzed directly by the at least one processor of the actuator device and the analyses are stored in the memory.

7. The actuator device according to claim 6, wherein external information is supplied to the memory via at least one connection and stored therein.

8. The actuator device according to claim 7, wherein the actuator device is to be supplied with energy via a first energy source and the main control unit connected to said actuator device is to be supplied with energy via a second energy source.

9. The actuator device according to claim 8, wherein energy as well as data and signals can be transmitted via connections in the actuator device.

10. The actuator device according to claim 9, wherein the wheel brake activated by the actuator is a parking brake.

11. The actuator device according to claim 10 wherein the at least one actuator device is included in an actuator system that also includes a main control device.

12. The actuator device according to claim 10 wherein at least one actuator device and a main control device are included in an electronic parking brake system.

13. A method for controlling an actuator device comprising the steps of:
   (a) providing an actuator device that includes:
   an actuator to activate a wheel brake of a land vehicle;
   an actuator control unit to control the actuator;
   a processing unit connected to the control unit that is operative to transmit signals to the actuator control unit, the processing unit being adapted to be connected to a main control unit that is external to the actuator device;
   a monitoring unit that is local to the actuator device and that is connected to the processing unit and the control unit; and
   a memory that is local to the actuator device and that is connected to the monitoring unit for storing actuator-specific information;
   (b) receiving signals transmitted by the external main control unit with the processing unit;
   (c) using the monitoring unit to compare the signals transmitted to the processing unit with actuator specific information stored in the memory;
   (d) depending on the result of the comparison in step (c), transmitting control signals to the actuator control unit either by the processing unit based on signals transmitted by the external main control unit, or by the monitoring unit, wherein the control signals in this case are signals generated by the monitoring unit itself; and
   (e) controlling the actuator by the actuator control unit on the basis of the control signals received by actuator the control unit.

* * * * *

UNITED STATES PATENT AND TRADEMARK OFFICE
CERTIFICATE OF CORRECTION

PATENT NO. : 8,452,507 B2
APPLICATION NO. : 12/747255
DATED : May 28, 2013
INVENTOR(S) : Gregor Poertzgen and Christian Dilla It is certified that error appears in the above-identified patent and that said Letters Patent is hereby corrected as shown below:

In the Claims:

Column 8, Line 64, Claim 13, after received by, insert -- the --.

Column 8, Line 64, Claim 13, after actuator, delete "the".

Signed and Sealed this
Ninth Day of July, 2013

Teresa Stanek Rea
*Acting Director of the United States Patent and Trademark Office*